(12) United States Patent
Ranganathan et al.

(10) Patent No.: US 11,268,852 B2
(45) Date of Patent: Mar. 8, 2022

(54) METHOD FOR LIGHT-TO-FREQUENCY CONVERSION AND LIGHT-TO-FREQUENCY CONVERTER ARRANGEMENT

(71) Applicant: ams International AG, Jona (CH)

(72) Inventors: Rohit Ranganathan, Eindhoven (NL); Ravi Kumar Adusumalli, Eindhoven (NL); Dinesh Kuruganti, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 19 days.

(21) Appl. No.: 16/971,035

(22) PCT Filed: Mar. 13, 2019

(86) PCT No.: PCT/EP2019/056329
§ 371 (c)(1),
(2) Date: Aug. 19, 2020

(87) PCT Pub. No.: WO2019/179854
PCT Pub. Date: Sep. 26, 2019

(65) Prior Publication Data
US 2021/0088380 A1 Mar. 25, 2021

(30) Foreign Application Priority Data
Mar. 19, 2018 (EP) .................................. 18162622

(51) Int. Cl.
*G01J 1/46* (2006.01)
*G01J 1/42* (2006.01)
*G01J 1/44* (2006.01)

(52) U.S. Cl.
CPC .......... *G01J 1/46* (2013.01); *G01J 2001/4247* (2013.01); *G01J 2001/4426* (2013.01)

(58) Field of Classification Search
CPC ................. G01J 1/46; G01J 2001/4247; G01J 2001/4426; H04N 5/2357
See application file for complete search history.

(56) References Cited

U.S. PATENT DOCUMENTS

| 5,303,027 A | 4/1994 | Kuderer et al. |
|---|---|---|
| 8,004,578 B2 | 8/2011 | Chao |

(Continued)

FOREIGN PATENT DOCUMENTS

| EP | 3370340 | 9/2018 |
|---|---|---|
| JP | H01-204578 | 8/1989 |

OTHER PUBLICATIONS

European Patent Office, International Search Report for PCT/EP2019/056329 dated Jun. 11, 2019.

(Continued)

*Primary Examiner* — Thanh Luu
*Assistant Examiner* — Monica T Taba
(74) *Attorney, Agent, or Firm* — MH2 Technology Law Group LLP

(57) ABSTRACT

A method for light-to-frequency conversion comprises the steps of illuminating a photodiode by a light source, generating a photocurrent by means of the photodiode, converting the photocurrent into a digital comparator output signal depending on a first clock signal, generating a first count comprising an integer number of counts, where the generation of the first count depends on the first clock signal, generating a second count which relates to the time interval between at least two counts of the first count, and determining the frequency of a repeating pattern in the intensity of electromagnetic radiation emitted by the light source and detected by the photodiode from the first count and the second count. Furthermore, a light-to-frequency converter arrangement is provided.

18 Claims, 11 Drawing Sheets

(56) References Cited

U.S. PATENT DOCUMENTS

| | | |
|---|---|---|
| 8,937,271 B2 | 1/2015 | Macknik |
| 2004/0201729 A1 | 10/2004 | Poplin et al. |
| 2012/0081570 A1 | 4/2012 | Hsieh |
| 2013/0113959 A1 | 5/2013 | Ho et al. |
| 2017/0168322 A1 | 6/2017 | Toner et al. |
| 2018/0376090 A1* | 12/2018 | Liu .................... H04N 5/3575 |

OTHER PUBLICATIONS

Goertzel Algorithm https://en.wikipedia.org/wiki/Goertzel_algorithm; downloaded Mar. 22, 2018.
Lehmann, B. et al: "Proposing measures of flicker in low frequency for lighting application" ECCE 2011 IEEE, pp. 2865-2872.
Poplawski et al.: "Exploring Flicker in SSL: What you might find, and how to deal with it" ArchLed 2011, http://www.architecturalssl.com/sslinteractive/media/293/ArchLED%20flicker%20presentation.Pdf.
Topband: "Proper Driver Design Elimates LED Light Strobe Flicker" http://www.tpled.com/Informationshow.aspx?code=040202&id=107; downloaded Mar. 22, 2018.

* cited by examiner

| CMAX | 275 | 275 | 275 | 275 |
|---|---|---|---|---|
| CMIN | 248 | 248 | 248 | 248 |
| P | 50580 | 20158 | 10216 | 4970 |
| fi | 20 | 50 | 100 | 200 |
| f | 19.8 | 49.6 | 97.9 | 201.2 |
| Mi | 5 | 5 | 5 | 5 |
| M | 5.2 | 5.2 | 5.2 | 5.2 |

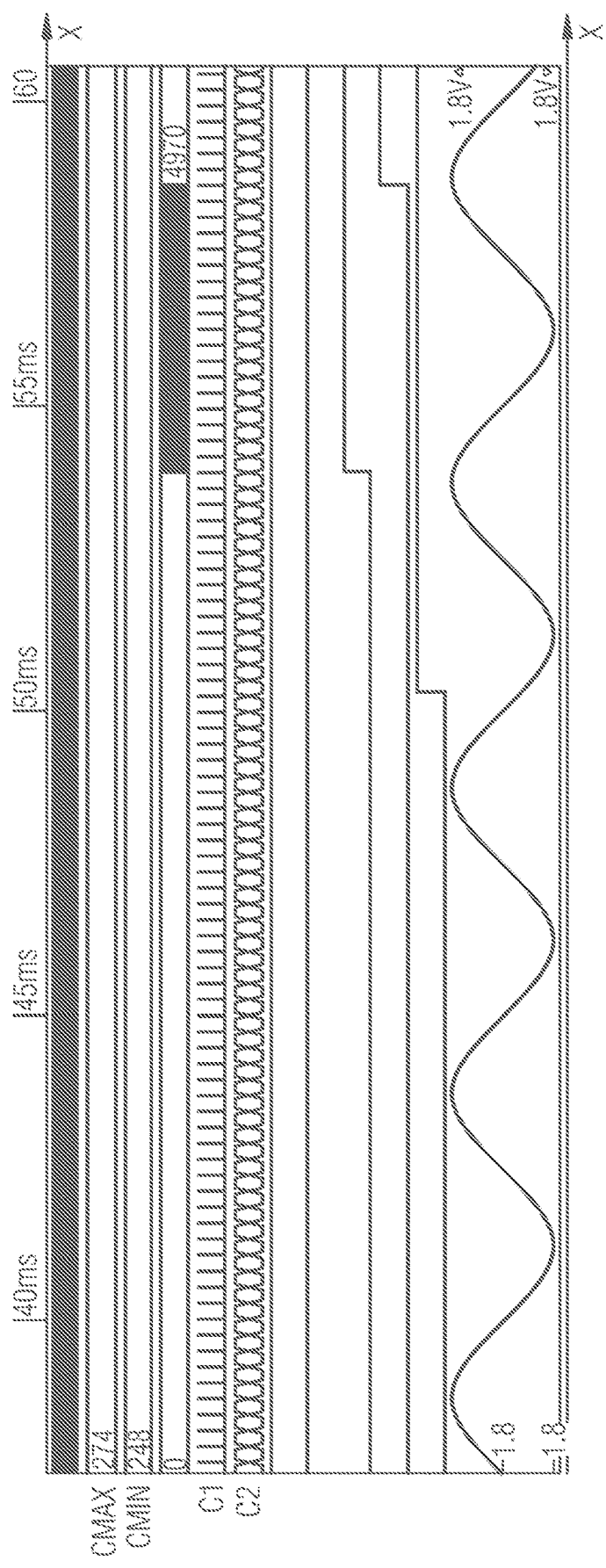

FIG 12A

| CMAX | 454 | 55 | 905 | 105 | 9004 | 1005 | 18004 | 2005 |
|---|---|---|---|---|---|---|---|---|
| P | 502 | 503 | 1000 | 1001 | 10002 | 10003 | 19997 | 20000 |
| fi | 2000 | 2000 | 1000 | 1000 | 100 | 100 | 50 | 50 |
| f | 1992 | 1988 | 1000 | 999 | 100 | 100 | 50 | 50 |
| Di | 10 | 90 | 10 | 90 | 10 | 90 | 10 | 90 |
| D | 9.6 | 89.1 | 9.5 | 89.5 | 10.0 | 90.0 | 10.0 | 90.0 |

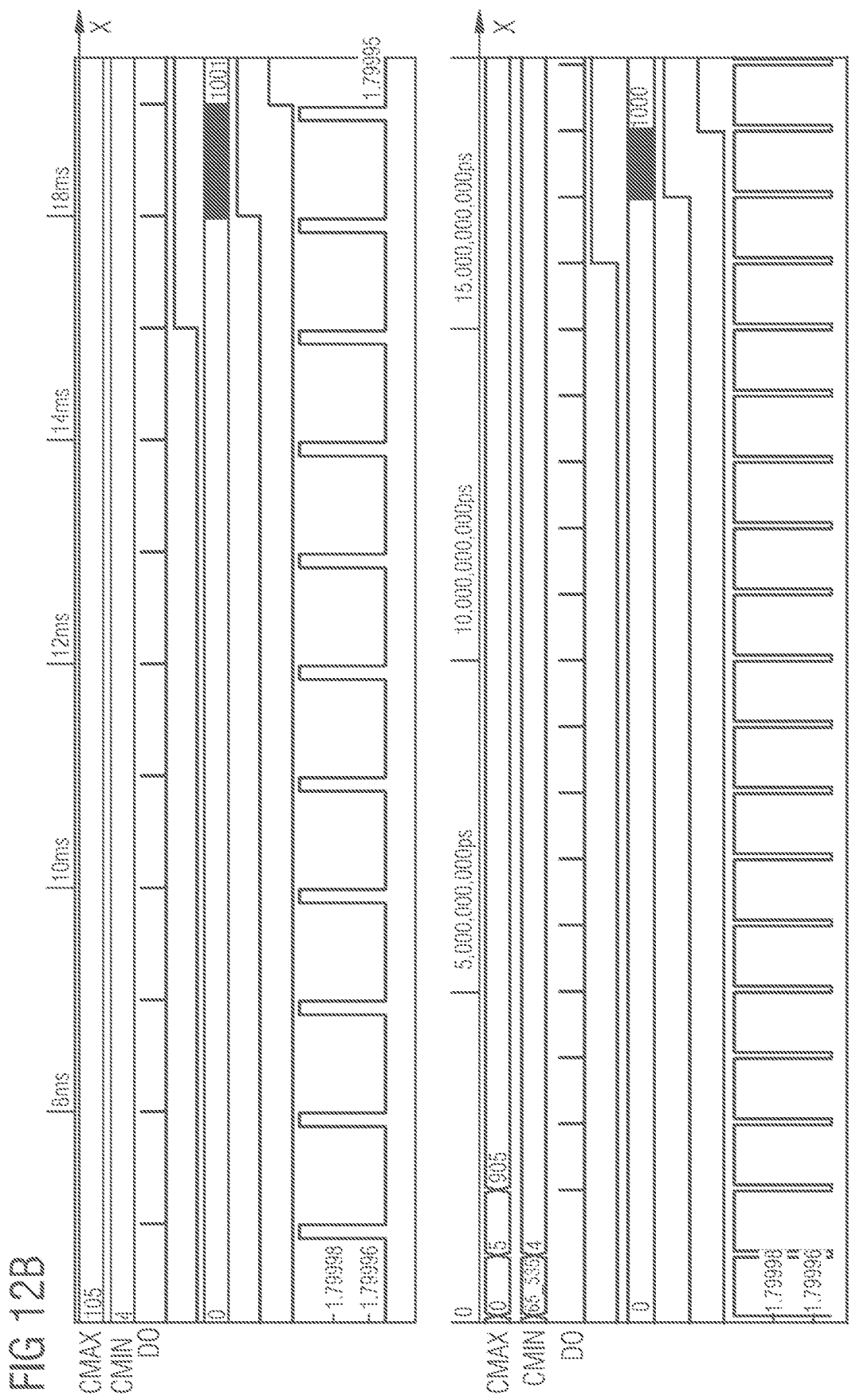

METHOD FOR LIGHT-TO-FREQUENCY CONVERSION AND LIGHT-TO-FREQUENCY CONVERTER ARRANGEMENT

CROSS-REFERENCE TO RELATED APPLICATIONS

The present application is the national stage entry of International Patent Application No. PCT/EP2019/056329, filed on Mar. 13, 2019, which claims the benefit of priority of European Patent Application No. 18162622.7, filed on Mar. 19, 2018, all of which are hereby incorporated by reference in their entirety for all purposes.

BACKGROUND OF THE INVENTION

The present disclosure relates to a method for light-to-frequency conversion and to a light-to-frequency converter arrangement.

In solid-state lighting the light source is in most cases directly connected to an alternating current (AC) power supply. The AC frequency can be for example 50 Hz or 60 Hz. As the light source, for example a light-emitting diode, is powered by the AC power supply the light emitted by the light source can be modulated. This means, the luminous flux of the light emitted by the light source can change with time with frequencies between a few Hz and a few kHz. This phenomenon is referred to as flicker.

Flicker of a light source can be detected by humans and can cause distraction or headache. But even if the flicker is not detected by a human observer, the flicker can cause headache or other maladies, as neurological problems.

Another reason for flicker can be the dimming of a light source by pulse width modulation. Frequencies of pulse width modulation between a few Hz and a few kHz can cause headache or other maladies as well.

SUMMARY OF THE INVENTION

This disclosure provides a method for light-to-frequency conversion with an increased accuracy. This disclosure further provides a light-to-frequency converter arrangement with an increased accuracy.

According to at least one embodiment of the method for light-to-frequency conversion, the method comprises the step of illuminating a photodiode by a light source. The photodiode can be arranged to detect electromagnetic radiation emitted by the light source. The light source can be for example a light-emitting diode, an incandescent lamp or a fluorescent lamp.

The method for light-to-frequency conversion further comprises the step of generating a photocurrent by means of the photodiode. The photocurrent can be a measure of the intensity of the electromagnetic radiation detected by the photodiode.

The method for light-to-frequency conversion further comprises the step of converting the photocurrent into a digital comparator output signal depending on a first clock signal. Therefor the photocurrent can be provided to an analog-to-digital converter arrangement. Furthermore, a first clock signal can be provided to the analog-to-digital converter arrangement. The first clock signal can be provided by a clock generator. The photocurrent provided to the analog-to-digital converter arrangement can be integrated by an integrating capacitor. An output voltage which depends on the photocurrent and the capacitance value of the integrating capacitor can be applied to a comparator. The comparator can provide a digital comparator output signal which has a different value depending on whether the output voltage is larger than a reference voltage supplied to the comparator or smaller. A latch which can be connected to the comparator can be arranged to provide the digital comparator output signal only at certain instances which are defined by the first clock signal.

Instead of the analog-to-digital converter arrangement described above any other analog-to-digital converter can be employed, as for example a first order integrator, a second order delta-sigma modulator or any oversampled analog-to-digital converter.

The method for light-to-frequency conversion further comprises the step of generating a first count comprising an integer number of counts, where the generation of the first count depends on the first clock signal. The first count can for example be determined from the digital comparator output signal in dependence of the first clock signal. This can mean, that the digital comparator output signal is provided only at certain instances which are defined by the first clock signal. The first count can for example comprise at least two counts. The counts of the first count can relate to predefined values of the digital comparator output signal. This can mean, that one count or an integer of counts is added to the first count according to the first clock signal and each time the digital comparator output signal has a predefined value.

The method for light-to-frequency conversion further comprises the step of generating a second count which relates to the time interval between at least two counts of the first count. The second count can comprise at least two values which each relate to the time interval between two succeeding or adjacent counts of the first count. The second count can be generated in such a way that the time interval between at least two succeeding counts of the first count is determined. Two succeeding counts of the first count can directly succeed each other. The second count can be generated in such a way that for each count of the first count the time interval to the respective succeeding count is determined. Therefore, the second count can comprise a plurality of values, where each value refers to the time interval between two succeeding counts of the first count.

The method for light-to-frequency conversion further comprises the step of determining the frequency of a repeating pattern in the intensity of electromagnetic radiation emitted by the light source and detected by the photodiode from the first count and the second count. A light source which is supplied with an alternating current can emit electromagnetic radiation with a modulated intensity. The intensity can be modulated by the alternating current. The modulation of the intensity is referred to as flicker. This means, the intensity of the electromagnetic radiation emitted by the light source can be modulated by a repeating pattern, as for example a sine wave. It is further possible that the intensity of the electromagnetic radiation emitted by the light source is modulated by pulse width modulation, for example in order to dim the light. Consequently, the intensity of the electromagnetic radiation emitted by the light source can change according to the repeating pattern. The repeating pattern can have a frequency. A signal processing unit which can be connected to the comparator can be configured to provide a digital output signal. The digital output signal can depend on the first count and on the second count and it can provide the frequency of the repeating pattern in the intensity of electromagnetic radiation emitted by the light source and detected by the photodiode. The frequency of the repeating pattern can be for example the frequency of a sine wave or of a pulse width modulation. Therefore, the flicker frequency of a light source can be determined.

The frequency of the repeating pattern in the intensity or the flicker frequency of a light source can be employed to reduce or cancel the impact of the modulation of the intensity. The accurate determination of the frequency of the repeating pattern allows a more accurate reduction or cancellation of the impact of the modulation. The method described here advantageously enables an accurate determination of the frequency of the repeating pattern.

Furthermore, it is not necessary to know the frequency of the repeating pattern beforehand. The frequency of the repeating pattern can be determined from the first count and the second count in a wide range of frequencies.

According to at least one embodiment of the method for light-to-frequency conversion, the frequency of the repeating pattern in the intensity of electromagnetic radiation emitted by the light source and detected by the photodiode is a flicker frequency of the light source. The flicker frequency refers to a modulation in the intensity of the electromagnetic radiation emitted by the light source which is caused for example by an AC power supply. In order to reduce or cancel the effect of flicker it is advantageous or necessary to know the flicker frequency. Therefore, the determination of the flicker frequency allows to reduce or cancel the impact of the flicker. It is desirable to reduce or cancel the impact of the flicker as flicker might cause headache or other maladies.

According to at least one embodiment of the method for light-to-frequency conversion, the photocurrent is integrated into one or more charge packages during an integration time, and the first count is determined from the number of charge packages detected during the integration time. Each charge package can refer to a predefined amount of charge. The photocurrent detected by the photodiode can be integrated by the integrating capacitor. During a set integration time a total amount of charge can be integrated on the integrating capacitor, where the total amount of charge can relate to at least one charge package or several charge packages. The number of counts of the first count can relate to the number of charge packages detected during the integration time. This means, for each charge package detected during the integration time, the number of counts of the first count is increased by one. In this way, the first count can be a measure of the intensity of the electromagnetic radiation detected by the photodiode.

According to at least one embodiment of the method for light-to-frequency conversion, for each charge package the same amount of charge is integrated. This means, each charge package comprises the same amount of charge. In this way, with the first count equally sized charge packages are counted which refer to the intensity of the electromagnetic radiation detected by the photodiode. By detecting equally sized charge packages a modulation of the intensity of the electromagnetic radiation over time can be detected.

According to at least one embodiment of the method for light-to-frequency conversion, the number of counts of the first count is increased by an integer number for each charge package. This means, the number of counts of the first count is a measure of the number of charge packages detected. For example, the number of counts of the first count can be increased by 1 for each charge package. In this way, the first count can be a measure of the intensity of the electromagnetic radiation detected by the photodiode.

According to at least one embodiment of the method for light-to-frequency conversion, the second count is reset when one time interval between two counts of the first count has been determined. This means, with the second count the time interval between each two succeeding or adjacent counts of the first count can be determined. The length of the time interval between two succeeding counts of the first count can be determined by the second count for each count of the first count. For each count of the first count the second count can be reset to a starting value which can be 0. The time interval between two counts of the first count can be determined via a second clock signal with a predefined frequency. Optionally, the frequency of the second clock signal is larger than the frequency of the first clock signal. Therefore, the second clock signal gives the time basis for the second count. The second count is generated in dependence of the second clock signal. As the second count is reset when one time interval between two counts of the first count has been determined, different values of the second count can be easily compared. Changes in the value of the second count relate to a modulation of the intensity of the detected electromagnetic radiation with time. By determining the time interval between two succeeding counts of the first count, properties of the modulation of the intensity of the electromagnetic radiation can be determined, as for example the frequency of the modulation.

According to at least one embodiment of the method for light-to-frequency conversion, a further second count is generated which relates to the time interval between at least two counts of the first count. The further second count can be generated in the same way as the second count. The further second count can be employed in a signal processing unit for determining the frequency of a repeating pattern in the intensity of the electromagnetic radiation emitted by the light source. As the shape of the repeating pattern in the intensity of the electromagnetic radiation emitted by the light source might not be known, both the second count and the further second count can be employed for determining the frequency of the repeating pattern. For example, the second count can be employed to determine the frequency for the case that the intensity of the electromagnetic radiation is pulse width modulated and the further second count can be employed to determine the frequency for the case that the repeating pattern is a sine wave. Therefore, the frequency of the repeating pattern can be determined also for the case that the shape of the repeating pattern is not known beforehand.

According to at least one embodiment of the method for light-to-frequency conversion, both the second count and the further second count are employed to determine the frequency of a repeating pattern in the intensity of electromagnetic radiation emitted by the light source and detected by the photodiode. This can mean that two detection algorithms run in parallel where the first algorithm is configured to detect a repeating pattern with the shape of a pulse width modulated wave and the second algorithm is configured to detect a repeating pattern with the shape of a sine wave. The first algorithm can be based on the first count and on the second count. The second algorithm can be based on the first count and the further second count. Therefore, by employing both the second count and the further second count to determine the frequency of the repeating pattern, advantageously both a sine wave modulation and a pulse width modulation can be detected.

According to at least one embodiment of the method for light-to-frequency conversion, the repeating pattern in the intensity of electromagnetic radiation emitted by the light source and detected by the photodiode is a sine wave and the frequency of the sine wave is determined. The repeating pattern can for example be a sine wave if the light source is directly coupled to an AC power supply. The frequency of the sine wave can be determined from the first count and the further second count. With the method described herein frequencies of a sine wave between for example 20 Hz and 500 Hz can be determined. Advantageously, the frequency of the sine wave can be determined for a broad range of frequencies.

According to at least one embodiment of the method for light-to-frequency conversion, the modulation index of the repeating pattern in the intensity of electromagnetic radiation emitted by the light source and detected by the photodiode is determined. The modulation index can also be referred to as the modulation percentage. The modulation index M can be given by:

$$M = \frac{A_{max} - A_{min}}{A_{max} + A_{min}}$$

where $A_{max}$ is the maximum amplitude of the intensity of the electromagnetic radiation and $A_{min}$ is the minimum amplitude of the intensity. Thus, the modulation index refers to the percentage of the modulation with respect to the total intensity of the electromagnetic radiation. The modulation index is a unique characteristic of a light source. Therefore, by determining the modulation index the reduction or cancellation of the modulation or flicker can be more accurate.

According to at least one embodiment of the method for light-to-frequency conversion, the repeating pattern in the intensity of electromagnetic radiation emitted by the light source and detected by the photodiode is formed by pulse width modulation and the frequency of the pulse width modulation is determined. In this case the light source can be a light emitting diode which can be dimmed by pulse width modulation. With the method described herein frequencies of a pulse width modulated wave between for example 20 Hz and 5 kHz can be determined. Advantageously, the frequency of the pulse width modulated wave can be determined for a broad range of frequencies.

According to at least one embodiment of the method for light-to-frequency conversion, the duty cycle of the pulse width modulation is determined. The duty cycle refers to the percentage of the time that electromagnetic radiation is emitted by the light source. The accurate determination of the duty cycle of the pulse width modulation allows a more accurate reduction or cancellation of the impact of the modulation.

Furthermore, a light-to-frequency converter arrangement is provided. The light-to-frequency converter arrangement can optionally be employed for the method for light-to-frequency conversion described herein. This means all features disclosed for the method for light-to-frequency conversion are also disclosed for the light-to-frequency converter arrangement and vice-versa.

In one embodiment of the light-to-frequency converter arrangement, the light-to-frequency converter arrangement comprises an analog-to-digital converter arrangement comprising a sensor input for connecting a photodiode, and a result output for providing a digital comparator output signal. The analog-to-digital converter arrangement is operated depending on a first clock signal. This can mean that the digital comparator output signal is only provided at the result output at certain instances which are defined by the first clock signal. The first clock signal can be provided to the analog-to-digital converter arrangement by a clock generator. The analog-to-digital converter arrangement is adapted to convert a photocurrent generated by the photodiode upon illumination with a light source into the digital comparator output signal.

The light-to-frequency converter arrangement further comprises a signal processing unit connected to the result output of the analog-to-digital converter arrangement. The signal processing unit is adapted to determine from the digital comparator output signal a first count and a second count, where the first count comprises an integer number of counts and the generation of the first count depends on the first clock signal, and where the second count relates to the time interval between at least two counts of the first count. The signal processing unit can further be adapted to determine from the digital comparator output signal a further second count which relates to the time interval between at least two counts of the first count.

The signal processing unit comprises a logic/calculation engine which receives the first count and the second count and which calculates a digital output signal from the first count and the second count. It is further possible that the logic/calculation engine further receives the further second count and that the logic/calculation engine calculates the digital output signal from the first count, the second count and the further second count.

The digital output signal is indicative of the frequency of a repeating pattern in the intensity of electromagnetic radiation emitted by the light source and detected by the photodiode.

In one embodiment of the light-to-frequency converter arrangement the digital output signal is further indicative of at least one of the following:
  the modulation index of the repeating pattern in the intensity of sine wave modulated electromagnetic radiation emitted by the light source and detected by the photodiode,
  the duty cycle of the repeating pattern in the intensity of pulse width modulated electromagnetic radiation emitted by the light source and detected by the photodiode.

The digital output signal can be indicative of the modulation index of the repeating pattern in case that the repeating pattern has the shape of a sine wave. The digital output signal can be indicative of the duty cycle of the repeating pattern in the case that the modulation of the intensity of the electromagnetic radiation is pulse width modulated.

The light to frequency converter arrangement described here can advantageously be employed to determine the frequency of a repeating pattern in the intensity of electromagnetic radiation emitted by a light source. This means, the flicker frequency or the frequency of pulse width modulation can be determined. As a modulation in the intensity of electromagnetic radiation emitted by a light source can cause headache, distraction or other maladies it is advantageous to determine the frequency of the repeating pattern in order to cancel or reduce the modulation of the intensity.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

With FIGS. 5, 6, 7, 8, 9 and 10 exemplary embodiments of the method for light-to-frequency conversion are described.

With FIGS. 11A, 11B, 12A and 12B exemplary values determined by an embodiment of the method for light-to-frequency conversion are provided.

DETAILED DESCRIPTION

Figure 1:
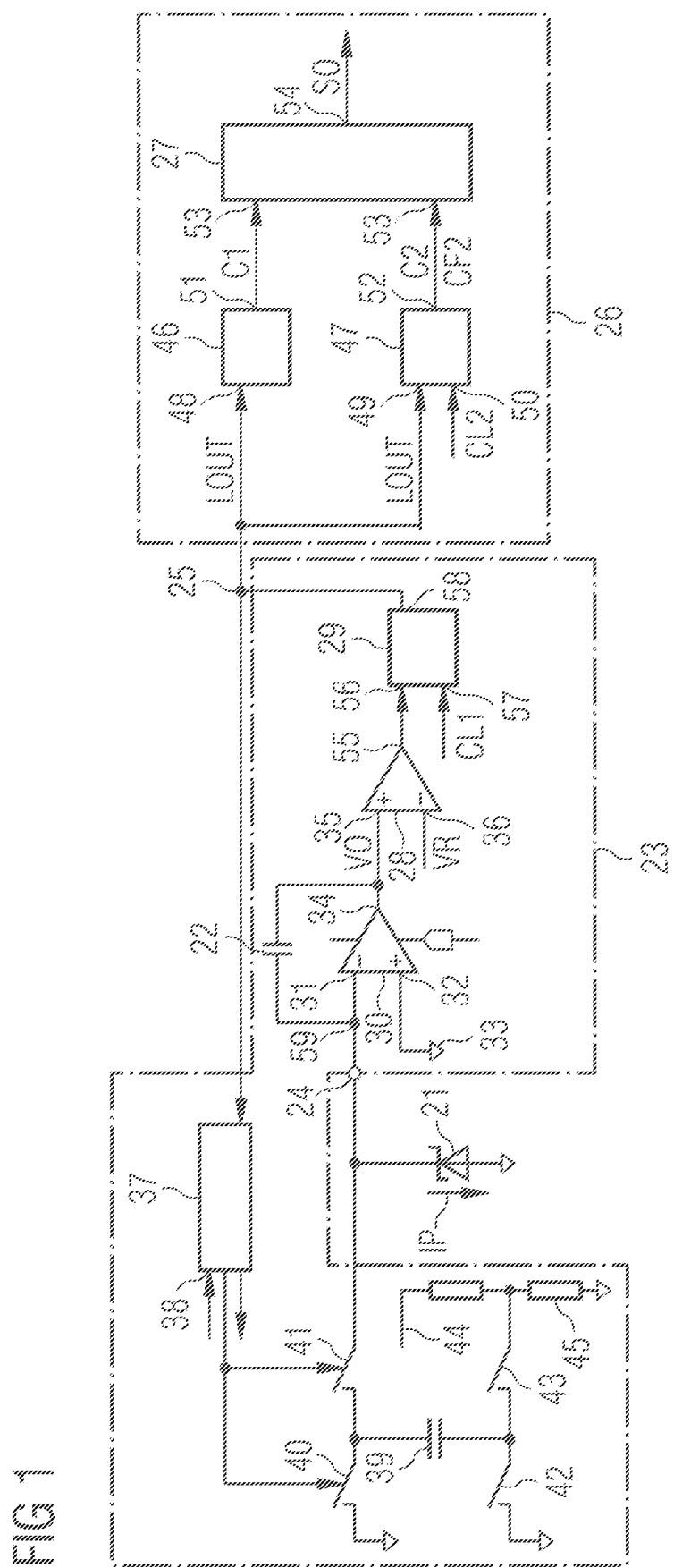
In FIG. 1 an exemplary embodiment of a light-to-frequency converter arrangement 20 is shown and an exemplary embodiment of the method for light to frequency conversion is described.

In FIG. 1 an exemplary embodiment of a light-to-frequency converter arrangement 20 is shown. The light-to-frequency converter arrangement 20 can be designed as an integrated circuit. The light-to-frequency converter arrangement 20 comprises an analog-to-digital converter arrangement 23 and a signal processing unit 26. The analog-to-digital converter arrangement 23 comprises a sensor input 24 for connecting a photodiode 21. The photodiode 21 is connected to the analog-to-digital converter arrangement 23 as an external device. It is further possible that the photodiode 21 is part of the analog-to-digital converter arrangement 23 in some embodiments. The analog-to-digital converter arrangement 23 further comprises a result output 25 for providing a digital comparator output signal LOUT.

The analog-to-digital converter arrangement 23 comprises an amplifier 30. The amplifier 30 comprises an amplifier input 31 which is connected to the sensor input 24. The amplifier input 31 is implemented as an inverting input. The amplifier 30 comprises a further amplifier input 32 which is a non-inverting input. The further amplifier input 32 is connected to a reference potential terminal 33. The analog-to-digital converter arrangement 23 further comprises an integrating capacitor 22 which connects the amplifier input 31 to an amplifier output 34 of the amplifier 30.

The analog-to-digital converter arrangement 23 further comprises a comparator 28 with a comparator input 35 which is connected to the amplifier output 34. The comparator input 35 is implemented as a non-inverting input. The comparator 28 comprises a further comparator input 36 which is an inverting input.

The analog-to-digital converter arrangement 23 further comprises a latch 29 which comprises a first latch input 56 and a second latch input 57. The first latch input 56 is connected to a comparator output 55 of the comparator 28. The latch 29 is configured to receive a first clock signal CL1 at the second latch input 57. A latch output 58 of the latch 29 is connected to the result output 25 of the analog-to-digital converter arrangement 23 and to a digital control circuit 37. The control circuit 37 comprises a control input 38 and a control logic. It is further possible that the control circuit 37 comprises one or more clock generators. The first clock signal CL1 can be provided by a clock generator (not shown) and/or be generated by the control circuit 37.

The analog-to-digital converter arrangement 23 further comprises a reference capacitor 39 which is connected in parallel to the sensor input 24. On one side the reference capacitor 39 is connected via a first switch 40 to a reference potential, e.g. a ground potential, and via a second switch 41 to the sensor input 24. On another side the reference capacitor 39 is connected via a third switch 42 to the reference potential and via a fourth switch 43 to a reset reference 44. The fourth switch 43 is connected to a voltage divider 45. The voltage divider 45 is connected between the reset reference 44 and ground potential. The first switch 40, the second switch 41, the third switch 42 and the fourth switch 43 are connected to the control circuit 37 via control lines.

The signal processing unit 26 of the light-to-frequency converter arrangement 20 is connected to the result output 25 of the analog-to-digital converter arrangement 23. The signal processing unit 26 comprises a first counter 46, a second counter 47 and a logic calculation engine 27. The first counter 46 comprises a first counter input 48 which is connected to the result output 25. The second counter 47 comprises a second counter input 49 which is connected to the result output 25. The second counter 47 further comprises a further second counter input 50 which is adapted to receive a second clock signal CL2. A first counter output 51 of the first counter 46 and a second counter output 52 of the second counter 47 are each connected to a calculation input 53 of a logic/calculation engine 27. The logic/calculation engine 27 comprises a calculation output 54. The signal processing unit 26 can, at least in parts, be implemented as a micro-controller.

The light-to-frequency converter arrangement 20 can be employed for light-to-frequency conversion. One embodiment of the method for light-to-frequency conversion described herein is described in the following with reference to FIG. 1.

Before signal acquisition starts the light-to-frequency converter arrangement 20 can be set to a reference condition. For example a control signal can be issued by the control circuit 37 which causes the first switch 40 and the fourth switch 43 to close while the second switch 41 and the third switch 42 are open. The voltage divider 45 provides a reset reference voltage VRR to the reference capacitor 39. The reference capacitor 39 generates a charge package Q. The charge package Q has a value according to $$Q = V_{RR} \cdot C_R,$$

wherein $C_R$ is a capacitance value of the reference capacitor 39 and $V_{RR}$ is a voltage value of the reset reference voltage VRR. The control circuit 37 issues another control signal which causes the first switch 40 and the fourth switch 43 to open and the second switch 41 and the third switch 42 to close. Therefore, the charge package Q is applied to an integration node 59 and the sensor input 24.

As a first step the photodiode 21 is illuminated by a light source. Upon illumination of the photodiode 21 a photocurrent IP is generated. The value of the photocurrent IP depends on the intensity of the electromagnetic radiation incident on the photodiode 21. The photocurrent IP flows to the sensor input 24. Thus, an input voltage VI is tapped at the amplifier input 31 and at the integration node 59 which is connected to the integrating capacitor 22. A reference voltage VR is supplied to the further amplifier input 32 by the reference potential terminal 33. The amplifier 30 generates an output voltage VO and provides the output voltage VO at the amplifier output 34.

The photocurrent IP is integrated on the integrating capacitor 22. The output voltage VO rises with time t as $$VO = I_P \cdot t \cdot C_{INT},$$

wherein $I_P$ is a value of the photocurrent IP and $C_{INT}$ denotes a capacitance value of the integrating capacitor 22.

The output voltage VO of the amplifier 30 is applied to the comparator input 35. At the further comparator input 36 a comparator reference voltage VCR is applied which is provided by a reference voltage source. The comparator 28 generates a digital comparator output signal LOUT depending on the values of the output voltage VO and of the comparator reference voltage VCR. The comparator output signal LOUT has a first logical value if the output voltage VO is larger than the comparator reference voltage VCR and has a second logical value if the output voltage VO is smaller than the comparator reference voltage VCR. This means, the comparator output signal LOUT indicates if a charge package Q of charge generated by the photodiode 21 is detected by the analog-to-digital converter arrangement 23. The comparator 28 and the latch 29 are operated as a latched comparator. The latch 29 outputs the comparator output signal LOUT only at certain instances which are defined by the first clock signal CL1. Due to the first clock signal CL1 the latched comparator is only comparing the output voltage VO of the amplifier 30 with the comparator reference voltage VCR at certain intervals of the first clock signal CL1. This means, the analog-to-digital converter arrangement 23 is operated depending on the first clock signal CL1.

During signal acquisition the signal processing unit 26 counts the pulses of the comparator output signal LOUT. The counting is done by the first counter 46. The first counter 46 generates a first count C1. The first count C1 relates to the number of pulses of the comparator output signal LOUT. This means, the first count C1 can for example count the number of charge packages Q detected by the analog-to-digital converter arrangement 23. In this case the first count C1 only counts the pulses of the comparator output signal LOUT which relate to the situation that the value of the output voltage VO is larger than the comparator reference voltage VCR. Thus, the first count C1 can be determined from the number of charge packages Q detected during a set integration time. The first count C1 comprises an integer number of counts and the generation of the first count C1 depends on the first clock signal CL1. The second counter 47 can be considered a free running counter operating on the second clock signal CL2. The second clock signal CL2 can be provided by a clock generator (not shown) and/or by the control circuit 37. The second counter 47 is reset by receiving the comparator output signal LOUT at the second counter input 49. The second counter 47 generates a second count C2, which relates to the time interval between two counts of the first count C1. It is further possible that the second counter 47 generates a further second count CF2 in the same way as the second count C2. Optionally, the second clock signal CL2 is implemented with a higher frequency when compared with the first clock signal CL1. For example, the first clock signal CL1 has a rectangular function with a frequency of 737 kHz and the second clock signal CL2 has a rectangular function with a frequency of 2 MHz.

The logic/calculation engine 27 receives the first count C1 and the second count C2 at the calculation inputs 53. It is further possible that the logic/calculation engine 27 receives the further second count CF2. The logic/calculation engine 27 calculates a digital output signal SO from the first count C1 and the second count C2. The digital output signal SO is indicative of the frequency f of a repeating pattern in the intensity of electromagnetic radiation emitted by the light source and detected by the photodiode 21. The repeating pattern in the intensity can be for example a sine wave or pulse width modulation. Therefore, the digital output signal SO is indicative of the frequency f of a modulation of the intensity which can be for example a flicker frequency.

Figure 2:
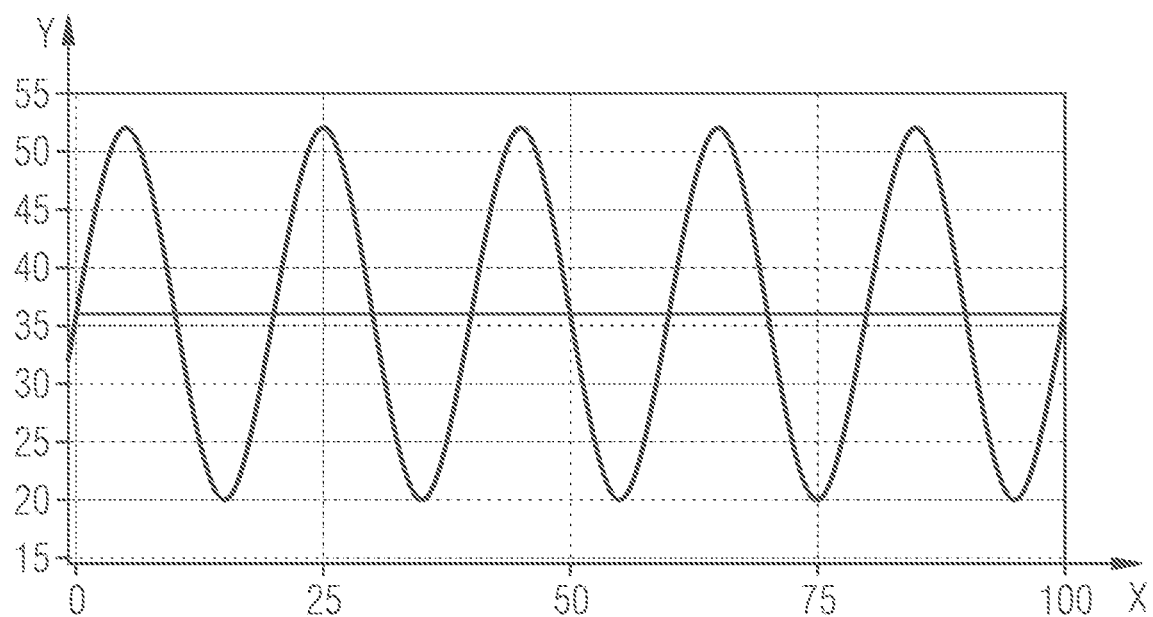
In FIG. 2 a photocurrent modulated by a sine wave is plotted.

In FIG. 2 a photocurrent IP modulated by a sine wave is plotted as an example. On the x-axis the time is plotted in ms and on the y-axis the photocurrent IP is plotted in pA. The photocurrent IP can for example be detected by a photodiode 21. The straight line refers to the average level of the photocurrent IP. As the light source is connected to an AC power supply the photocurrent IP is modulated by a sine wave which results in a modulation of the photocurrent IP as shown in FIG. 2. This means the intensity of the electromagnetic radiation emitted by the light source and thus also the photocurrent IP change with time. This phenomenon is referred to as flicker.

Figure 3:
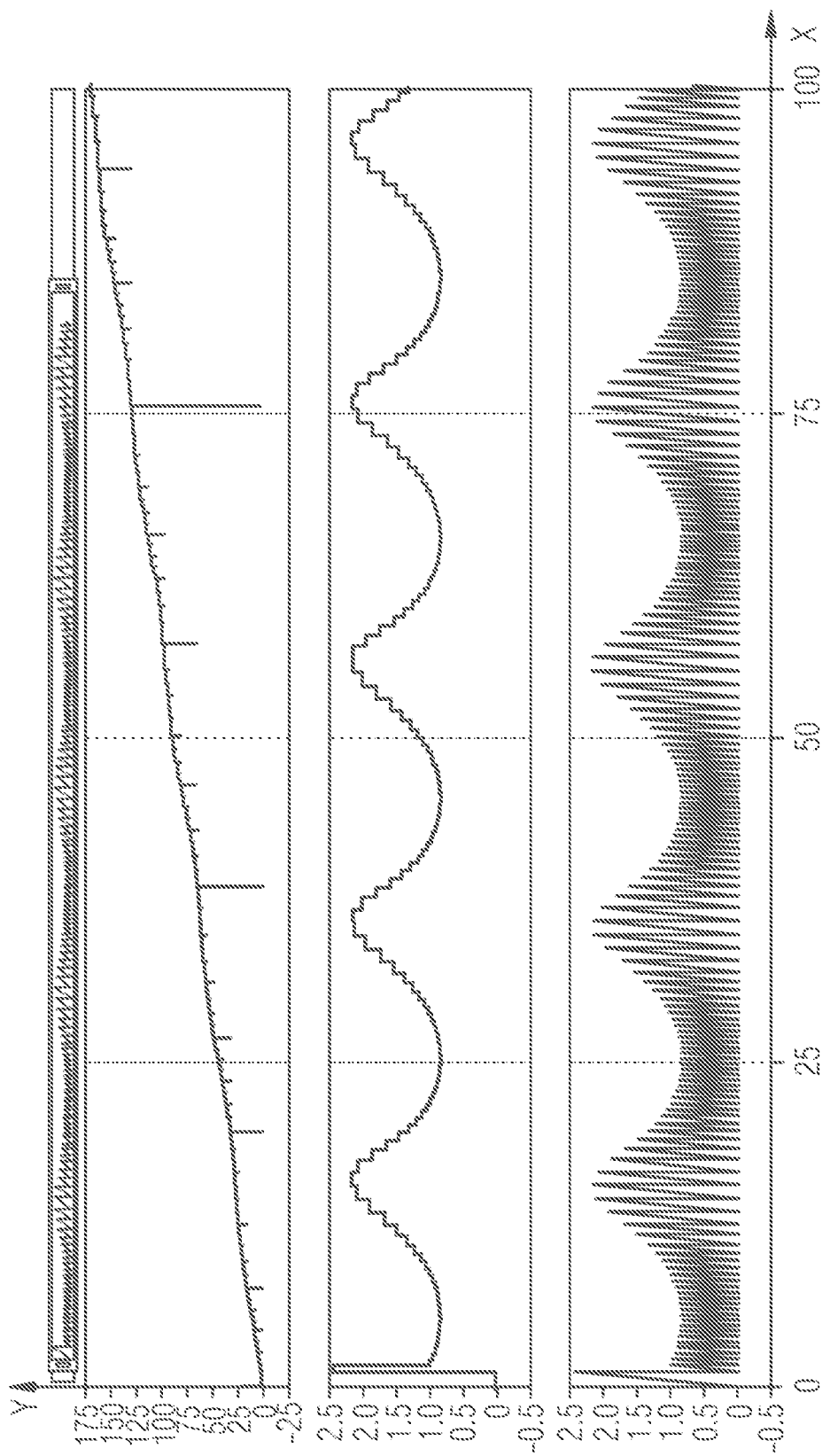
In FIGS. 3 and 4 examples for the first count, the second count and the output signal are plotted.

In FIG. 3 examples for the first count C1, the further second count CF2 and the output signal SO are plotted. On the x-axis the time is plotted in ms. On the upper y-axis the first count C1 is plotted in V. The first count C1 is increased by an integer number each time a charge package Q is detected. The first count C1 is plotted over the time. This means, the length of each step of the first count C1 relates to a time interval determined by the further second count CF2. Therefore, the modulation of the electromagnetic radiation detected by the photodiode 21 can be seen in the first count C1 plotted over the time as the time intervals between two counts of the first count C1 are not constant. In this case the electromagnetic radiation emitted by the light source is modulated by a sine wave.

On the middle y-axis a difference count CD is plotted in V. The length of time of each step of the difference count CD is given by the further second count CF2. This means the length of each step of the difference count CD relates to the time interval between two counts of the first count C1. The value in y-direction of the difference count CD relates to the difference between two succeeding values of the further second count CF2. This means, a value of the difference count CD is determined by the difference between two succeeding values of the further second count CF2. From a maximum value of the difference count CD on the time intervals between two counts of the first count C1 become shorter. This means, while the value of the difference count CD decreases the amplitude of the sine wave increases. With an increasing amplitude of the sine wave more charge packages Q are detected and therefore the time intervals between two counts of the first count C1 become shorter. From a minimum value of the difference count CD on the time intervals between two counts of the first count C1 become longer. This means, the amplitude of the sine wave decreases. With a decreasing amplitude of the sine wave less charge packages Q are detected and therefore the time intervals between two counts of the first count C1 become longer.

On the lower y-axis an example of the output signal SO is plotted in V. The output signal SO is generated from the first count C1, the further second count CF2 and the difference count CD. From the output signal SO the frequency f of the repeating pattern in the intensity of the electromagnetic radiation can be determined. Furthermore, it can be determined at which positions the amplitude of the sine wave is maximal and at which positions the amplitude of the sine wave is minimal. For example, the time interval between one maximum value of the output signal SO and the following maximum value of the output signal SO gives a period P of the repeating pattern in the intensity. Therefore, the frequency f of the repeating pattern in the intensity is given by 1/P.

Figure 4:
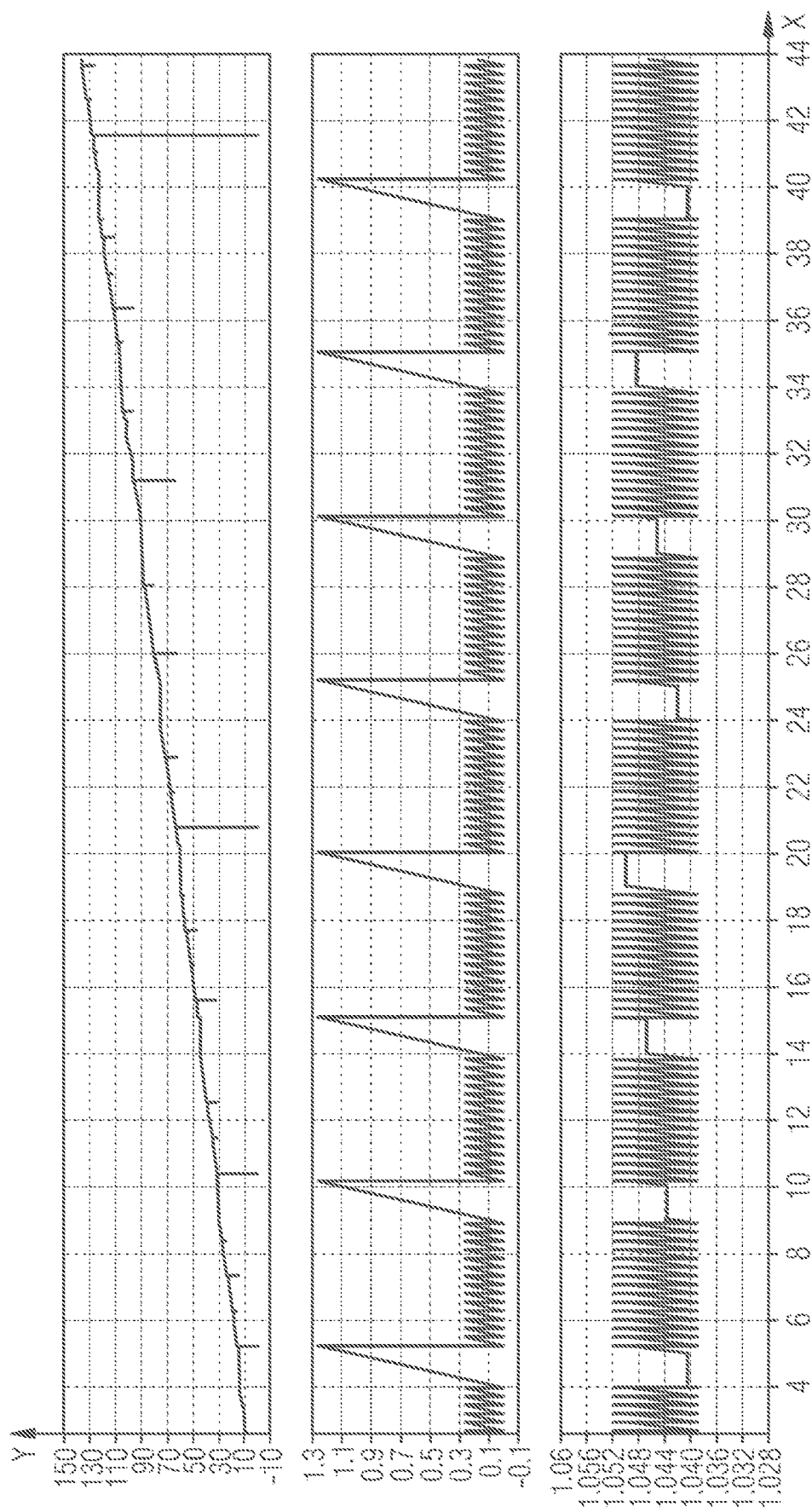

In FIG. 4 examples for the first count C1, the second count C2 and the output signal SO are plotted. On the x-axis the time is plotted in ms. On the upper y-axis the first count C1 is plotted in V as described with FIG. 3. In contrast to the case shown in FIG. 3, the electromagnetic radiation emitted by the light source is pulse width modulated in the case shown in FIG. 4. On the middle y-axis the second count C2 is plotted in kV. The y-value of the second count C2 relates to the time interval measured between two counts of the first count C1. For each count of the first count C1 the second count C2 is reset to 0 and for each count of the first count C1 the second count C2 measures the time interval until the next count of the first count C1. The time basis of the second count C2 is given by the second clock signal CL2. As the electromagnetic radiation emitted by the light source is pulse width modulated two different phases are detected. When the light source is switched on during the on-time of the pulse width modulation charge packages Q are detected by the analog-to-digital converter arrangement 23. In this phase the time intervals between two counts of the first count C1 are equal in length as the intensity of the electromagnetic radiation is constant. When the light source is switched off during the off-phase of the pulse width modulation it takes more time until a charge package Q is detected by the analog-to-digital converter arrangement 23. Therefore, the second count C2 plotted on the middle y-axis increases to a larger value than during the on-time of the pulse width modulation. On the lower y-axis the output signal SO is plotted. The output signal SO remains constant between the off-phases and it follows the shape of the second count C2 during the on-phases. From the relation between the duration of the on-phase to the duration of the off-phase the frequency f and the duty cycle D of the pulse width modulation can be determined. The calculation of the frequency f and the duty cycle D are described in more detail with FIG. 6.

Figure 5:
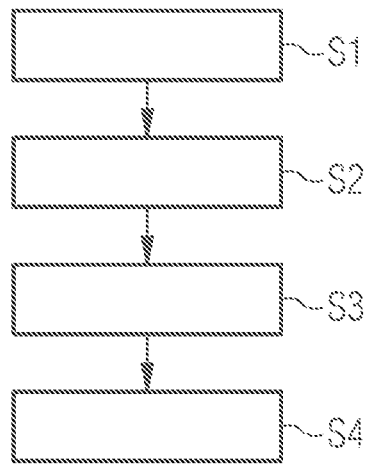

FIG. 5 shows a schematic diagram which shows the order of the steps of the method for light-to-frequency conversion. In a first step S1 the light-to-frequency measurement is started. This means, the light-to-frequency converter arrangement 20 is set to a reference condition and the photodiode 21 is illuminated by the light source. In a second step S2 the counting of the light-to-frequency converter arrangement 20 is started. This means, the first clock signal CL1 and the second clock signal CL2 are provided.

Furthermore, the photocurrent IP generated by the photodiode 21 is provided to the integrating capacitor 22. In a third step S3 with the detection of a charge package Q the first count C1 is increased by an integer number and the second count C2 is started. During this step the measurement is running until either a sine wave or a pulse width modulated wave is detected by the logic calculation engine 27. This means, two detection algorithms run in parallel where the first algorithm is configured to detect a repeating pattern with the shape of a pulse width modulated wave and the second algorithm is configured to detect a repeating pattern with the shape of a sine wave. The first algorithm is based on the first count C1 and on the second count C2. The second algorithm is based on the first count C1 and the further second count CF2. The first algorithm is described in more detail in FIG. 6 and the second algorithm is described in more detail in FIG. 7. In a fourth step S4 the frequency f of the repeating pattern is calculated. The calculation of the frequency f of the repeating pattern is described in more detail with FIG. 10.

Figure 6:
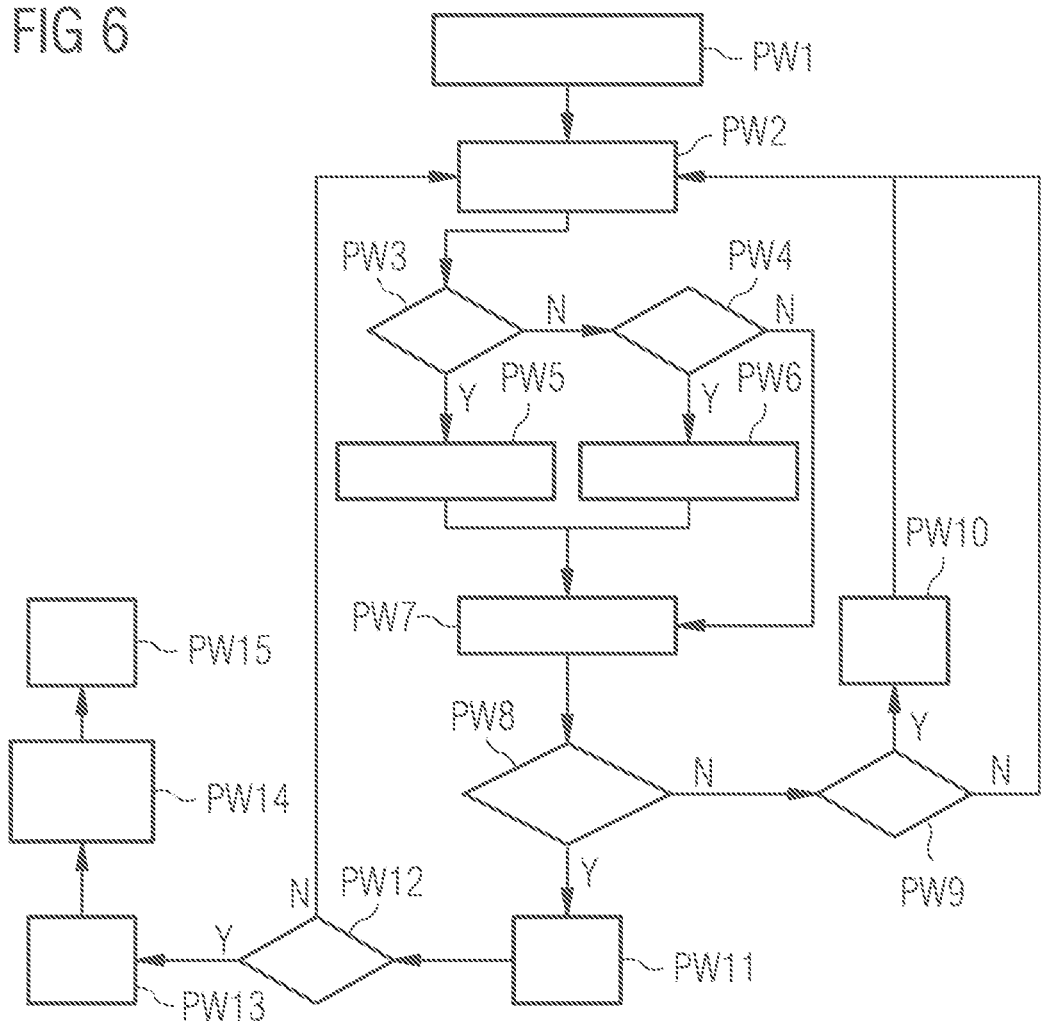

With FIG. 6 the first detection algorithm is described in more detail. The first algorithm enables to detect a pulse width modulation of the intensity of electromagnetic radiation detected by the photodiode 21. In a first step PW1 of the first algorithm the variables of the first algorithm are set. A minimum value CMIN of the second count C2 is set to an initial value. A maximum value CMAX of the second count C2 is set to 0. A limit value CLM relates to the number of periods P of the pulse width modulation which are to be detected until the first algorithm gives the signal that a pulse width modulation is detected. The limit value CLM is set to an initial value which can be for example 8. The other variables required for the first algorithm are set to 0.

In a next step PW2 the second count C2 starts to run at the time at that a charge package Q is detected and the first count C1 is increased. The second count C2 is running until the next count of the first count C1 is detected and the second count C2 measures the time between the two counts of the first count C1. For the next step of the first algorithm the value of the second count C2 is set to the measured time interval between the two counts of the first count C1.

In a next step PW3 the value of the second count C2 is compared to the minimum value CMIN of the second count C2. In case that the value of the second count C2 is smaller than the minimum value CMIN as a next step the step PW4 follows which is marked with N at the arrow between the steps PW3 and PW4. In case that the value of the second count C2 is larger than the minimum value CMIN as a next step the step PW5 follows which is marked with Y at the arrow between the steps PW3 and PW5.

In the step PW4 the value of the second count C2 is compared to the maximum value CMAX of the second count C2. During the first run-through of the first algorithm the value of the second count C2 will always be larger than the maximum value CMAX which was initially set to 0.

If the value of the second count C2 is larger than the maximum value CMAX, the maximum value CMAX is set to the value of the second count C2 in step PW6 which is marked with Y at the arrow between the steps PW4 and PW6. This means, the maximum value CMAX always refers to the maximum value which was detected for the second count C2.

If the value of the second count C2 is smaller than the maximum value CMAX the step PW7 follows as the next step.

The minimum value CMIN always refers to the minimum value which was detected for the second count C2. Therefore, if in the step PW3 it is found that the value of the second count C2 is smaller than the minimum value CMIN, the minimum value CMIN is set to the value of the second count C2 in step PW5.

The step PW7 follows after both steps PW5 and PW6. In step PW7 the value of the second count C2 is stored. In the first run-through of the first algorithm the value of the second count C2 is stored as a first storage value ST1. In every second run-through the value of the second count C2 is stored as a second storage value ST2.

In the next step PW8 the first storage value ST1 is compared to the second storage value ST2. As the second storage value ST2 is still set to 0 during the first run-through the values are not equal. If the first storage value ST1 is not equal to the second storage value ST2 as a next step the step PW9 follows which is marked with N at the arrow between the steps PW8 and PW9.

In the step PW9 it is checked if a variable count equal CE is set to 1. Initially, the variable count equal CE is set to 0. The variable count equal CE can only be set to the value 1 in a later step PW11.

As the variable count equal CE is set to 0 as a next step the step PW2 follows again which is marked with N at the arrow between the steps PW9 and PW2.

In a next run-through of the first algorithm is determined if the next value of the second count C2 is different from the preceding value of the second count C2. In case of a pulse width modulation as shown in FIG. 4 consecutive values of the second count C2 have the same value during the on-phase of the pulse width modulation. In this case the first storage value ST1 and the second storage value ST2 compared in the step PW8 have the same value. Therefore, as a next step follows the step PW11 which is marked with Y at the arrow between the steps PW8 and PW11.

In the next step PW11 the variable count equal CE is set to 1.

In a next step PW12 it is checked if a variable detect off-phase DO has the value 1. The variable detect off-phase DO can only be set to 1 in the step PW10. Thus, as a next step follows again the step PW2 which is marked with N at the arrow between the steps PW12 and PW2.

During the off-phase of the pulse width modulation the value of the second count C2 is different from the value of the second count C2 during the on-phase of the pulse width modulation. This means, for the off-phase of the pulse width modulation the comparison of the first storage value ST1 and the second storage value ST2 during the step PW8 gives that the first storage value ST1 is different from the second storage value ST2. Therefore, as a next step follows the step PW9. As the variable count equal CE is already set to 1, the step PW10 follows at next. In the step PW10 the variable detect off-phase DO is set to 1 as an off-phase of the pulse width modulation is detected. The variable count equal CE is set to 0 again. Only if two subsequent counts of the second count C2 have the same value again, which means that another on-phase of the pulse width modulation is detected, the variable count equal CE will be set to 1 again. This means, two on-phases of the pulse width modulation and one off-phase are detected. If the variable detect off-phase DO has the value 1 again the step PW13 follows after the step PW12 which is marked with Y at the arrow between the steps PW12 and PW13.

In the step PW13 a variable count period CP is increased by an integer number. The variable count period CP counts the number of periods P of the pulse width modulation which are detected. This means, the variable count period CP can for example count the number of detected off-phases. Furthermore, the variable detect off-phase DO is set to 0 again.

In a next step PW14 the value of the variable count period CP is compared to the set value of the variable limit value CLM.

Once the value of the variable count period CP reaches the value of the variable limit value CLM in a step PW15 the first algorithm provides the information that a pulse width modulation is detected. By setting the value of the variable limit value CLM it can be determined how many cycles of the pulse width modulation are to be detected before the first algorithm stops and provides the information that a pulse width modulation is detected.

Figure 7:
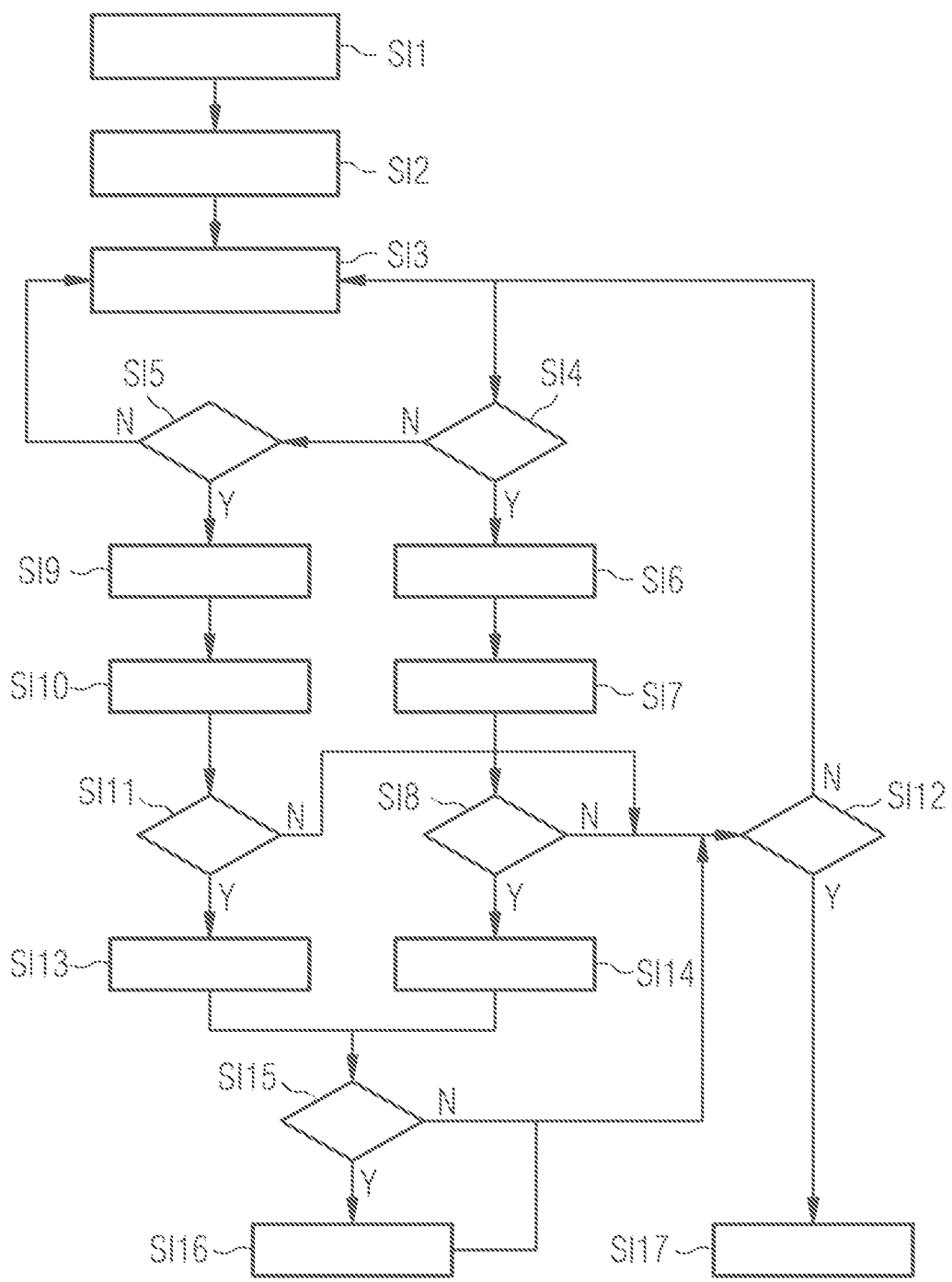

With FIG. 7 the second detection algorithm is described in more detail. The second algorithm enables to detect a sine modulation of the intensity of electromagnetic radiation detected by the photodiode 21. In a first step SI1 of the second algorithm the variables of the second algorithm are set. A minimum value CMIN of the further second count CF2 is set to an initial value. A maximum value CMAX of the further second count CF2 is set to 0. A limit value CLM relates to the number of consecutive increments or decrements observed for the further second count CF2 which are to be detected until the second algorithm gives the signal that a sine wave modulation is detected. The limit value CLM is set to an initial value which can be for example 4. The other variables required for the second algorithm are set to 0.

In a second step SI2 a third count C3 is started. The third count C3 is arranged to run during the second algorithm and to stop after a time of 20 ms.

In a next step SI3 the further second count CF2 starts to run at the time at that a charge package Q is detected and the first count C1 is increased. The further second count CF2 is running until the next count of the first count C1 is detected and the further second count CF2 measures the time between the two counts of the first count C1. For the next step of the second algorithm the value of the further second count CF2 is set to the measured time interval between the two counts of the first count C1.

In a next step SI4 the value of the further second count CF2 is compared to the minimum value CMIN. In case that the value of the further second count CF2 is smaller than the minimum value CMIN as a next step the step SI6 follows which is marked with Y at the arrow between the steps SI4 and SI6. That the value of the further second count CF2 is smaller than the minimum value CMIN means that the time interval between two succeeding counts of the first count C1 is smaller than the initial minimum value CMIN or a preceding minimum value CMIN.

In the step SI6 the minimum value CMIN is set to the value of the further second count CF2. Thus, the minimum value CMIN always gives the smallest value of the further second count CF2.

In a next step SI7 a variable decrement count DEC is increased by an integer number. This means, the variable decrement count DEC is increased by an integer number each time that the time interval between two counts of the first count C1 is a smaller than the time interval between the two preceding counts of the first count C1. Furthermore, in the step SI7 a variable increment count INC is set to 0. The variable increment count INC is increased by an integer number each time that the time interval between two counts of the first count C1 is larger than the time interval between the two preceding counts of the first count C1.

In a next step SI8 it is checked if the value of the variable decrement count DEC equals the value of the limit value CLM. Only if the variable decrement count DEC is increased for a set number of times given by the limit value CLM the second algorithm gives the information that the values of the further second count CF2 are decreasing with time. If the value of the decrement count DEC is smaller than the value of the limit value CLM as a next step follows the step SI12 which is marked with N at the arrow between the steps SI8 and SI12.

In the step SI12 it is checked if the third count C3 reached the value of 20 ms. If this value is not reached as a next step follows again the step SI3 which is marked with N at the arrow between the steps SI12 and SI3.

From the step SI3 the algorithm starts in the same way again. If at one point the value of the further second count CF2 is equal to or larger than the minimum value CMIN, a step SI5 follows after the step SI4.

In the step SI5 the value of the further second count CF2 is compared to the maximum value CMAX. If the value of the further second count CF2 is smaller than the maximum value CMAX the following step is the step SI3 again which is marked with N at the arrow between the steps SI5 and SI3. If the value of the further second count CF2 is larger than the maximum value CMAX the following step is the step SI9 which is marked with Y at the arrow between the steps SI5 and SI9.

In the step SI9 the value of the maximum value CMAX is set to the value of the further second count CF2.

In a next step SI10 the increment count INC is increased by an integer number. In this case the time interval between two counts of the first count C1 is larger than the time interval between the two preceding counts of the first count C1. Furthermore, in the step SI10 the decrement count DEC is set to 0.

In a next step SI11 it is checked if the value of the increment count INC equals the value of the limit value CLM. Only if the increment count INC is increased for a set number of times given by the limit value CLM the second algorithm gives the information that the values of the further second count CF2 are increasing with time. If the value of the increment count INC is smaller than the value of the limit value CLM as a next step follows the step SI12 which is marked with N at the arrow between the steps SI11 and SI12.

Once the value of the increment count INC equals the value of the limit value CLM a step SI13 follows after the step SI11 which is marked with Y at the arrow between the steps SI11 and SI13. In this case an intensity of the electromagnetic radiation detected by the photodiode 21 which is decreasing with time is detected. For an intensity which is decreasing with time, the time intervals between two counts of the first count C1 increase.

Once the value of the decrement count DEC equals the value of the limit value CLM a step SI14 follows after the step SI8 which is marked with Y at the arrow between the steps SI8 and SI14. In this case an intensity of the electromagnetic radiation detected by the photodiode 21 which is increasing with time is detected. For an intensity which is increasing with time, the time intervals between two counts of the first count C1 decrease.

In a step SI15 which follows after both steps SI13 and SI14 it is checked if both the decrement count DEC and the increment count INC equal the value of the limit value CLM. In this case, it was detected that the intensity of the electromagnetic radiation increased and decreased again or the other way around. If both the determined count DEC and the increment count INC equal the value of the limit value CLM as a next step follows a step SI16 which is marked with Y at the arrow between the steps SI15 and SI16. In the step SI16 the information is provided by the second algorithm that a sine wave is detected.

If the decrement count DEC and/or the increment count INC are not equal to the value of the limit value CLM as a next step follows the step SI12 again which is marked with N at the arrow between the steps SI15 and SI12.

After the step SI16 it is checked as well if the third count C3 reached the time of 20 ms. If the third count C3 did not reach the time of 20 ms as a next stop follows the step SI3 again. If the third count C3 reached the time of 20 ms, in a last step SI17 the information that a sine wave is detected is provided.

Figure 8:
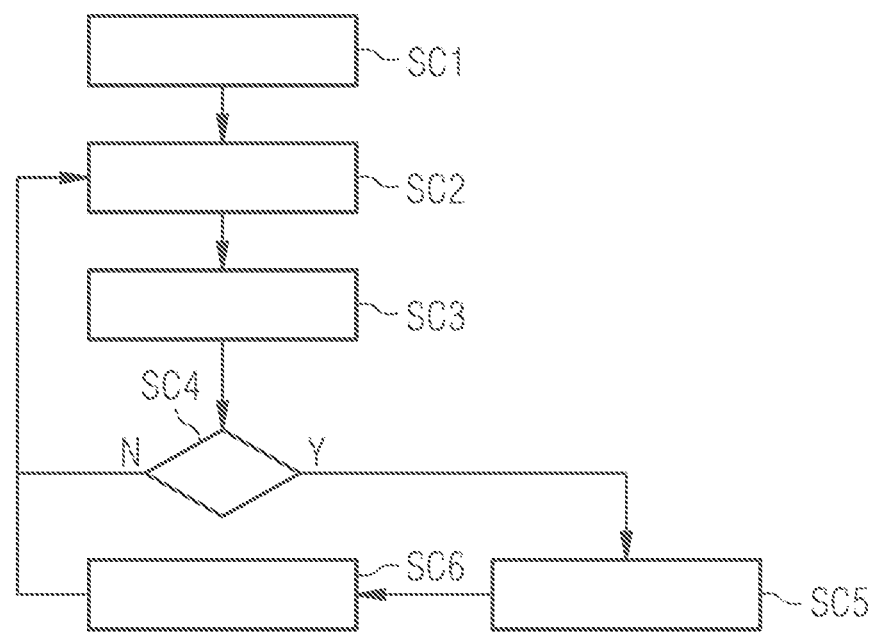

With FIG. 8 the implementation of the second count C2 is described. The same applies for the further second count CF2. In a first step SC1 the second count C2 is started. In a next step SC2 it is waited for the positive edge of the second clock signal CL2 which gives the time basis for the second count C2. In a next step SC3 the value of the second count C2 is increased by the time interval which relates to the time interval between two second clock signals CL2. In a next step SC4 it is checked if the next count of the first count C1 is detected. If no count of the first count C1 is detected, the next step is the step SC2 again. If a count of the first count C1 is detected the next step is a step SC5. In step SC5 the value of the second count C2 is employed in the first algorithm and in the second algorithm. In a last step SC6 the value of the second count C2 is set to 0 again.

Figure 9:
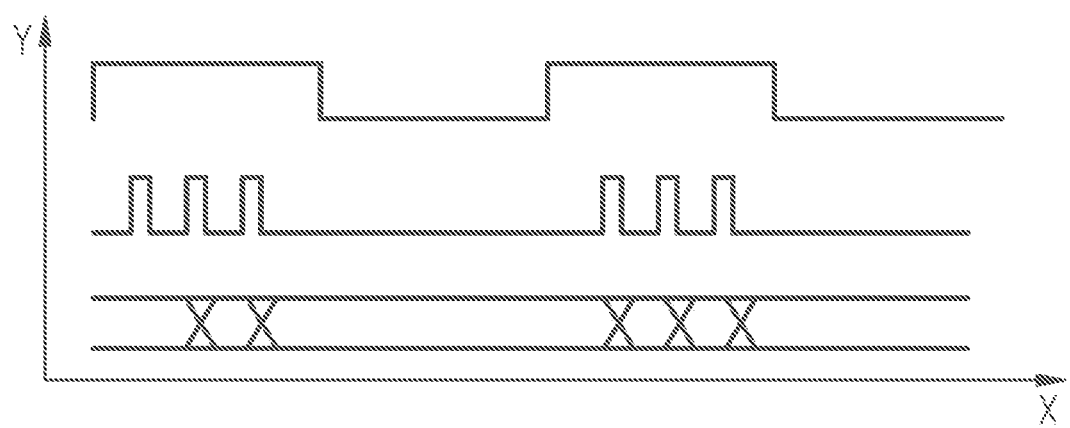

In FIG. 9 a pulse width modulated signal, the first count C1 and the second count C2 are plotted over time. On the x-axis the time is plotted in arbitrary units. The top line on the y-axis shows a pulse width modulated signal with a duty cycle D of 50%. In the middle line of the y-axis an exemplary first count C1 is plotted. During the on-phase of the pulse width modulation the first count C1 counts the detected charge packages Q. During the off-phase of the pulse width modulation no charge packages Q are detected. The bottom line on the y-axis shows the second count C2. After the second count of the first count C1 the second count C2 starts to measure the time intervals between two succeeding counts of the first count C1.

Figures 10, 11A:
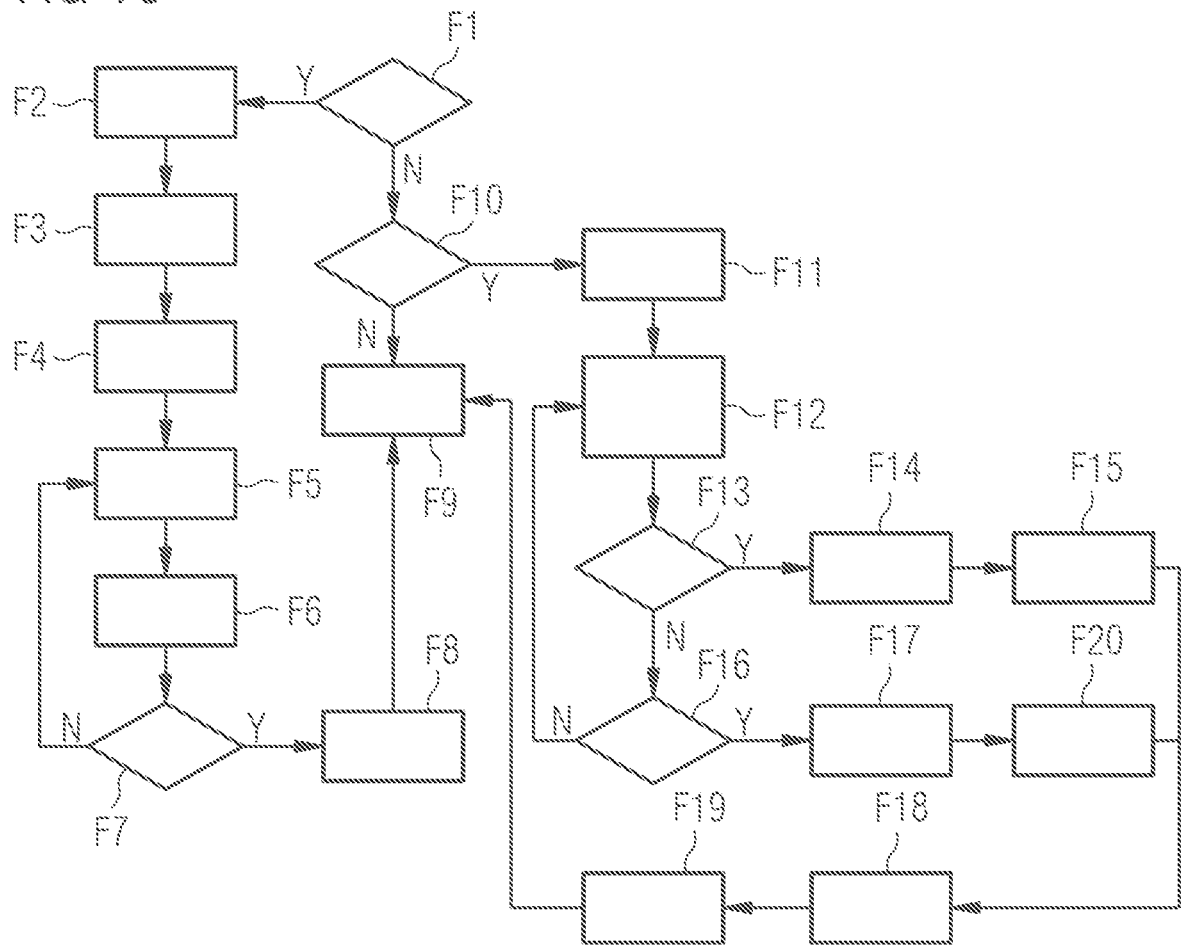

With FIG. 10 the calculation of the frequency f of the repeating pattern is described. The frequency f can be calculated either after with the first algorithm a pulse width modulation is detected or after with the second algorithm a sine wave modulation is detected. In a first step F1 for determining the frequency f it is checked if a pulse width modulation is detected. If a pulse width modulation is detected as a next step follows a step F2 which is marked with Y at the arrow between the steps F1 and F2. In the step F2 a variable frequency count FC is set to 0. In a next step F3 it is waited for the positive edge of the signal detect off-phase DO. In a next step F4 the value of the variable frequency count FC is set to the value of the second count C2. In a next step F5 it is waited for the positive edge of the second clock signal CL2. When the positive edge of the second clock signal CL2 is detected, in a next step F6 the value of the frequency count FC is increased by a value which corresponds to the time interval between two signals of the second clock signal CL2. In a next step F7 it is checked if the signal detect off-phase DO is detected again. If the signal detect off-phase DO is not yet detected again as a next step follows the step F5 again which is marked with N at the arrow between the steps F7 and F5. If the signal detect off-phase DO is detected again as a next step follows a step F8 which is marked with Y at the arrow between the steps F7 and F8. In the step F8 the frequency f and the duty cycle D of the pulse width modulation are calculated. The frequency f is given by:

$$f = \frac{1}{FC}.$$

The duty cycle D is given by:

$$D = \frac{FC - CMAX}{FC}.$$

In a next step F9 the frequency f and the duty cycle D are provided by the logic/calculation engine 27, for example as the output signal SO.

If no pulse width modulation is detected after the step F1 follows a step F10 which is marked with N at the arrow between the steps F1 and F10. In the step F10 it is checked if a sine wave modulation is detected. If no sine wave modulation is detected, no frequency f can be provided in the following step F9. If a sine wave modulation is detected as a next step follows a step F11 which is marked with Y at the arrow between the steps F10 and F11. In the step F11 the variable frequency count FC is set to 0. In a next step F12 it is waited until the further second count CF2 is equal to one of the minimum value CMIN and the maximum value CMAX. In a next step F13 it is checked if the further second count CF2 is equal to the maximum value CMAX. If the further second count CF2 is equal to the maximum value CMAX as a next step follows a step F14 which is marked with Y at the arrow between the steps F13 and F14. In the step F14 the frequency count FC is started and it determines the time interval until the further second count CF2 has the value of the maximum value CMAX again. The time basis of the frequency count FC is given by the second clock signal CL2. In a next step F15 it is waited until the further second count CF2 is equal to the maximum value CMAX again. Once the further second count CF2 is equal to the maximum value CMAX again the frequency count FC is stopped in a step F18. This means, the frequency count FC relates to the length of one period P of the sine wave. In a next step F19 the frequency f and the modulation index M are calculated. The frequency f is given by:

$$f = \frac{1}{FC}.$$

The modulation index M is given by:

$$M = \frac{CMAX - CMIN}{CMAX + CMIN}.$$

In the next step F9 the frequency f and the modulation index M are provided by the logic/calculation engine 27, for example as the output signal SO. It is further possible to calculate the frequency f and the modulation index M from the time interval between two minimum values CMIN of the further second count CF2. If in step F13 the further second count CF2 is not equal to the maximum value CMAX it is checked in a step F16 if the further second count CF2 is equal to the minimum value CMIN. If the further second count CF2 is not equal to the minimum value CMIN as a next step follows the step F12 again which is marked with N at the arrow between the steps F16 and F12. If the further second count CF2 is equal to the minimum value CMIN as a next step follows a step F 17 which is marked with Y at the arrow between the steps F16 and F17. In the step F17 the frequency count FC is started. In a next step F20 it is waited until the further second count CF2 is equal to the minimum value CMIN again. After the step F20 follows the step F18. The following calculation of the frequency f and the modulation index M is as described above.

In FIG. 11A exemplary values obtained by the second algorithm are provided. Four different input frequencies fi as the frequency f of a sine wave modulation in the intensity of electromagnetic radiation detected by the photodiode 21 are provided to the second algorithm. The input frequency fi is given in Hz. For each input frequency fi the calculated frequency f, the input modulation index Mi, the calculated modulation index M, the maximum value CMAX, the minimum value CMIN and the number of periods P are provided.

In FIG. 11B the values provided in FIG. 11A for the frequency of 200 Hz are plotted over the time. On the x-axis the time is plotted in ms. On the y-axis as an example a sine wave is plotted and the variables maximum value CMAX, minimum value CMIN, the first count C1 and the second count C2.

In FIG. 12A exemplary values obtained by the first algorithm are provided. Four different input frequencies fi as the frequency of a pulse width modulation in the intensity of electromagnetic radiation detected by the photodiode 21 are provided to the first algorithm. The input frequency fi is given in Hz. For each input frequency fi the calculated frequency f, the input duty cycle Di, the calculated duty cycle D, the maximum value CMAX and the number of periods P are provided.

In FIG. 12B the values provided in FIG. 12A for the frequency of 1 kHz are plotted over the time. In the upper diagram the duty cycle D amounts to 10% and in the lower diagram the duty cycle D months to 90%. On the x-axis the time is plotted in ms. On the y-axis the pulse width modulated signal and the variables maximum value CMAX, minimum value CMIN and detect off-phase DO are plotted.

The invention claimed is:

1. A method for light-to-frequency conversion, the method comprising:
    illuminating a photodiode by a light source,
    generating a photocurrent by means of the photodiode,
    converting the photocurrent into a digital comparator output signal depending on a first clock signal,
    generating from the digital comparator output signal in dependence of the first clock signal a first count comprising an integer number of counts,
    generating a second count which relates to the time interval between at least two counts of the first count, and
    determining from the first count and the second count the frequency of a repeating pattern in the intensity of electromagnetic radiation emitted by the light source and detected by the photodiode.

2. The method for light-to-frequency conversion according to claim 1, wherein the counts of the first count relate to predefined values of the digital comparator output signal.

3. The method for light-to-frequency conversion according to claim 1, wherein each count of the second count relates to the time interval between two succeeding or adjacent counts of the first count, respectively.

4. The method for light-to-frequency conversion according to claim 1, wherein the frequency of the repeating pattern in the intensity of electromagnetic radiation emitted by the light source and detected by the photodiode is a flicker frequency of the light source.

5. The method for light-to-frequency conversion according to claim 1, wherein
    the photocurrent is integrated into one or more charge packages during an integration time, and
    the first count is determined from the number of charge packages detected during the integration time.

6. The method for light-to-frequency conversion according to claim 5, wherein for each charge package the same amount of charge is integrated.

7. The method light-to-frequency conversion according to claim 5, wherein the number of counts of the first count is increased by an integer number for each charge package.

8. The method for light-to-frequency conversion according to claim 1, wherein the second count is reset when one time interval between two counts of the first count has been determined.

9. The method light-to-frequency conversion according to claim 1, wherein a further second count is generated which relates to the time interval between at least two counts of the first count.

10. The method for light-to-frequency conversion according to claim 9, wherein both the second count and the further second count are employed to determine the frequency of a repeating pattern in the intensity of electromagnetic radiation emitted by the light source and detected by the photodiode.

11. The method for light-to-frequency conversion according to claim 1, wherein the repeating pattern in the intensity of electromagnetic radiation emitted by the light source and detected by the photodiode is a sine wave and the frequency of the sine wave is determined.

12. The method for light-to-frequency conversion according to claim 11, wherein the modulation index of the repeating pattern in the intensity of electromagnetic radiation emitted by the light source and detected by the photodiode is determined.

13. The method for light-to-frequency conversion according to claim 1, wherein the repeating pattern in the intensity of electromagnetic radiation emitted by the light source and detected by the photodiode is formed by pulse width modulation and the frequency of the pulse width modulation is determined.

14. The method for light-to-frequency conversion according to claim 13, wherein the duty cycle of the pulse width modulation is determined.

15. A light-to-frequency converter arrangement, comprising:
  an analog-to-digital converter arrangement comprising a sensor input for connecting a photodiode, and a result output for providing a digital comparator output signal, and
  a signal processing unit connected to the result output of the analog-to-digital converter arrangement; wherein
  the analog-to-digital converter arrangement is operated depending on a first clock signal,
  the analog-to-digital converter arrangement is adapted to convert a photocurrent generated by the photodiode upon illumination with a light source into the digital comparator output signal,
  the signal processing unit is adapted to determine from the digital comparator output signal a first count and a second count, where the first count comprises an integer number of counts and the generation of the first count depends on the first clock signal, and where the second count relates to the time interval between at least two counts of the first count,
  the signal processing unit comprises a logic/calculation engine which receives the first count and the second count and which calculates a digital output signal from the first count and the second count, and
  the digital output signal is indicative of the frequency of a repeating pattern in the intensity of electromagnetic radiation emitted by the light source and detected by the photodiode.

16. The light-to-frequency converter arrangement according to claim 15, wherein the digital output signal is further indicative of at least one of the following:
  the modulation index of the repeating pattern in the intensity of sine wave modulated electromagnetic radiation emitted by the light source and detected by the photodiode,
  the duty cycle of the repeating pattern in the intensity of pulse width modulated electromagnetic radiation emitted by the light source and detected by the photodiode.

17. The light-to-frequency converter arrangement according to claim 15, wherein the counts of the first count relate to predefined values of the digital comparator output signal.

18. The light-to-frequency converter arrangement according to claim 15, wherein each count of the second count relates to the time interval between two succeeding or adjacent counts of the first count, respectively.

* * * * *